United States Patent [19]
Greggain

[11] Patent Number: 5,379,241
[45] Date of Patent: Jan. 3, 1995

[54] METHOD AND APPARATUS FOR QUADRATIC INTERPOLATION

[75] Inventor: Lance Greggain, Woodbridge, Canada

[73] Assignee: Genesis Microchip, Inc., Ontario, Canada

[21] Appl. No.: 172,065

[22] Filed: Dec. 23, 1993

[51] Int. Cl.⁶ .............................................. G06F 7/38
[52] U.S. Cl. .................................................. 364/723
[58] Field of Search ..................... 364/723, 718, 724.01

[56] References Cited

U.S. PATENT DOCUMENTS

| | | | |
|---|---|---|---|
| 3,789,203 | 1/1974 | Catherall et al. | 364/723 |
| 4,649,414 | 9/1987 | Christopher | 364/723 |
| 4,763,293 | 8/1988 | Takei et al. | 364/723 |
| 5,068,816 | 11/1991 | Noetzel | 364/723 |
| 5,257,355 | 10/1993 | Akamatsu | 364/723 X |

Primary Examiner—Tan V. Mai
Attorney, Agent, or Firm—Staas & Halsey

[57] ABSTRACT

A method of signal sample interpolation utilizing a second order curve comprising the steps of utilizing a linear interpolator to select a mid-point between respective input samples, thereby eliminating phase error and spatial variation, utilizing the interpolated points as reference points for a quadratic interpolation wherein the space between the reference points is one half the distance between respective signal sample points, and thirdly combining the operations of linear interpolation and quadratic interpolation for simultaneous execution. More particularly, the quadratic interpolation is re-formed based on the output of the linear interpolation.

3 Claims, 3 Drawing Sheets

METHOD AND APPARATUS FOR QUADRATIC INTERPOLATION

FIELD OF THE INVENTION

The present invention relates in general to interpolations and more particularly to a quadratic interpolator for generating a series of output samples forming an approximate curve between successive input signal samples.

BACKGROUND OF THE INVENTION

Mathematical interpolation has been used for many years in many fields of science for approximating curves between known signal sample points. The subject of interpolation is treated in many text-books, such as Robert L. Ketter and Sherwood P. Prawel Jr., entitled "Modern Methods of Engineering Computation", McGraw Hill 1969. Many advanced methods of interpolation have been used in digital signal processing for many years, as described in Rabiner L. R. and Schafer "Digital Processing of Speech Signals", Prentice Hall, 1978, as well as George Wolberg entitled "Digital Image Warping", IEEE Computer Society Press, 1988.

According to the known prior art interpolation techniques utilized in digital signal processing, interpolation has been restricted to either linear interpolation or cubic interpolation. Quadratic interpolation has not been hitherto implemented in digital signal processing systems because prior art quadratic interpolators are known to be space variant and to introduce phase distortion in the output signal. One paper that is often cited as being the definitive paper on this subject is by R. W. Schafer and L. R. Rabiner and is entitled "A Digital Signal Processing Approach to Interpolation", Proceedings of the IEEE, volume 61 June 1973.

Linear interpolation is a commonly used form of interpolation in which a straight line $$y = ax + b \quad \text{(equation 1)}$$

is passed through two known points (e.g. y(0) and y(1)). Points that lay between x=0 and x=1 are determined by evaluating $$y = y(0) + (y(1) - y(0))x \text{ for } 0 \leq x \leq 1. \quad \text{(equation 2)}$$

Linear interpolation has been preferred over cubic interpolation in the field of digital signal processing since, even though the frequency response of linear interpolation is inferior to that of cubic interpolation. Cubic interpolation systems require a great deal more calculation and storage hardware to implement than linear interpolation.

Quadratic interpolation as described in the abovediscussed reference of Ketter and Prawel, and many others, is achieved by fitting a quadratic equation of the form $$y = ax^2 + bx + c \quad \text{(equation 3)}$$

to three known points (e.g. y(−1), y(0) and y(1)). The resulting interpolation equation is:

$$y = ((y(-1) - 2y(0) + y(1))/2)x^2 + ((y(1) - y(-1))/2)x + y(0) \quad -1 \leq x \leq +1 \quad \text{(equation 4)}$$

The main disadvantage of using quadratic interpolation in digital signal processing and other applications is the distortion which occurs at the transition from one set of sample points to another. As discussed in greater detail below with reference to the Figures, incorrect selection of a reference sample point can result in significant curve discontinuities (i.e. distortion) in the output interpolated curve approximation between the points.

SUMMARY OF THE INVENTION

According to the present invention a method and apparatus are provided for implementing quadratic interpolation with low phase distortion and an absence of discontinuities caused by inappropriate selection of reference points. According to the invention, reference points are determined for implementing the interpolation in such a manner as to eliminate phase distortion and spatial variation. The determination of these reference points is accomplished using a linear interpolator for selecting the mid-point between input samples. Next, the interpolated points are used as reference points for a quadratic interpolation where the space between the reference points is one half the distance between respective known sample points. Thus, the quadratic interpolation implemented according to the present invention may be expressed by the following formula:

$$y(x) = ((y(-0.5) - 2y(0) + y(0.5))/0.5)x^2 + (y(0.5) - y(-0.5))x + y(0) \quad -0.5 \leq x \leq +0.5 \quad \text{(equation 5)}$$

According to the preferred embodiment, the operations of linear interpolation and quadratic interpolation discussed above, are performed simultaneously by reforming the quadratic interpolation equation based on the output of the linear interpolation equation. The resulting quadratic formula is as follows:

$$y = (y(-1) - 2y(0) + y(1))x^2 + ((y(1) - y(-1))/2)x + y(0) \quad -0.5 \leq x \leq +0.5 \quad \text{(equation 6)}$$

The output signal sample values of y are interpolated in a plus or minus 0.5 range about the centre sample, assuming an arbitrary sample spacing of 1.0. However, the principles of the present invention may be extended for sample spacing other than 1, by simply selecting reference points which are one half of the given sample spacing.

BRIEF DESCRIPTION OF THE DRAWINGS

A description of the prior art and of the preferred embodiment of the present invention is provided hereinbelow with reference to the following drawings in which.

DETAILED DESCRIPTION OF THE PRIOR ART AND OF THE PREFERRED EMBODIMENT

Figure 1B:
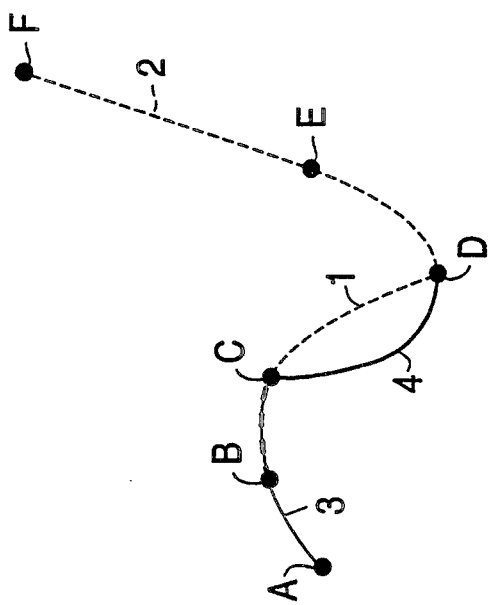
FIG. 1B shows two possible approximation curves obtained utilizing quadratic interpolation according to the prior art.
Figure 1A:
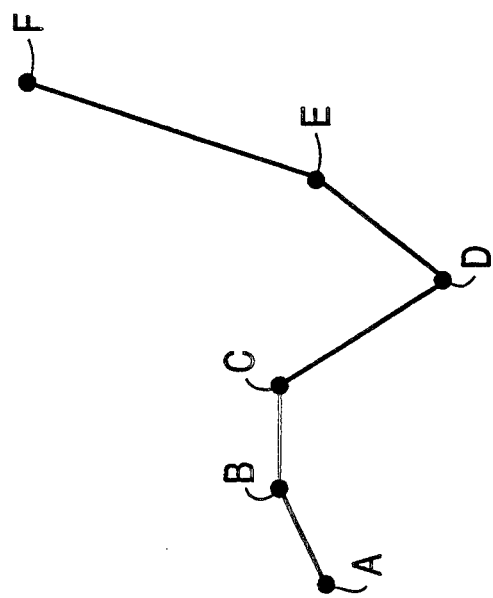
FIG. 1A is an approximated curve between a plurality of known signal sample points generated by linear interpolation according to the prior art.

Turning to FIG. 1A, a curve is shown which is an approximation utilizing known sample points A, B, C, D, E, and F utilizing linear interpolation. As will be noted, since linear interpolation is being utilized, the curves between respective ones of the points A, B, C, etc. are linear. This results in an extremely rough approximation of the actual curve between the known signal sample points, and also results in the generation of significant harmonic distortion due to the sharp edges of the approximated curve.

By way of contrast, the curves 1 and 2 illustrated in FIG. 1B, which have been generated by utilizing quadratic interpolation, are much smoother but are otherwise close in approximation to the curve generated by linear interpolation (FIG. 1A). However, as discussed above, the main disadvantage of utilizing quadratic interpolation in digital signal processing results from spatial variance and phase distortion during the transition from one set of samples to another. While lines 1 and 2 in FIG. 1B represent a possible approximation curve generated by quadratic interpolation and which is also generated by the same quadratic interpolation but is quite similar to the one described by the linear interpolation of FIG. 1A, the curve represented by lines 3 and 4 is radically different. The difference between obtaining lines 1 and 2 or lines 3 and 4 using the same quadratic interpolation is a matter of which three pixels are used as the reference points for the interpolation (curve 1 is uses points B, C, D and curve 2 used points D, E, F whereas curve 3 uses points A, B, C and curve 4 uses points C, D, E). Lines 3 and 4 show a marked discontinuity that is extremely undesirable in digital signal processing and other scientific applications.

Figure 2A:
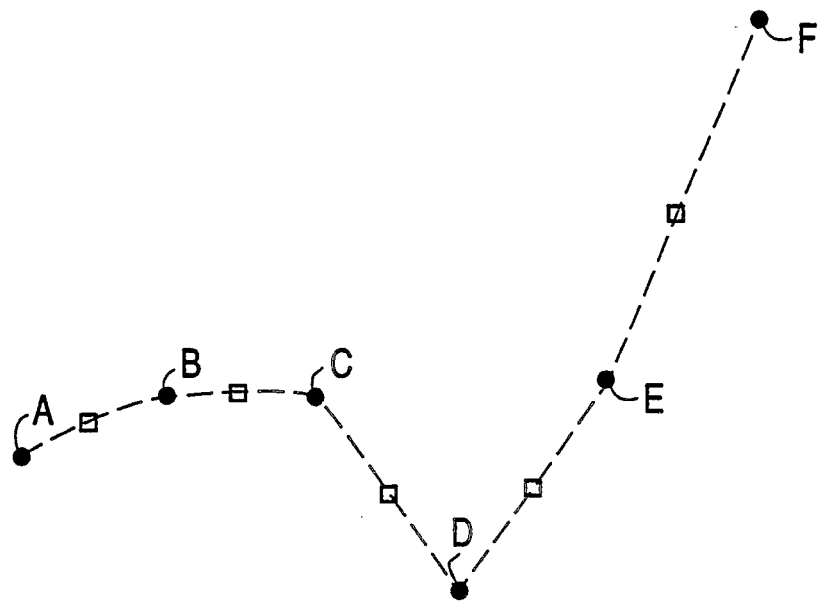
FIG. 2A shows the determination of reference points selected at the mid-point between input samples using linear interpolation, according to one aspect of the present invention.
Figure 2B:
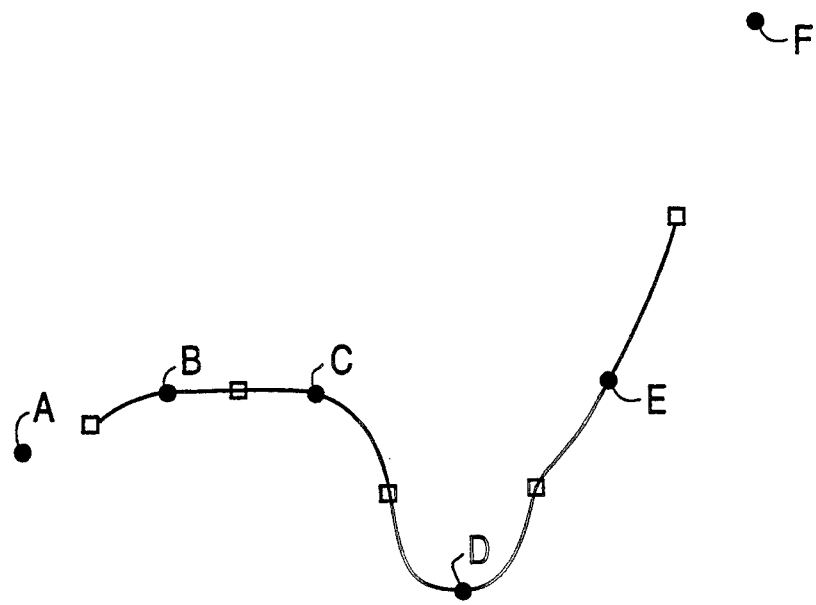
FIG. 2B shows a curve constructed using quadratic interpolation using the mid-points determined by linear interpolation in FIG. 2A, according to another aspect of the present invention.

Turning now to FIGS. 2A and 2B, according to the method of the present invention, rather than using the known signal sample points A, B, C, D, E and F as reference points, linear interpolation is used in the present invention to determine respective mid-points between the input samples, as shown in FIG. 2A.

Next, the interpolated reference points are utilized in a quadratic formula where the space between the reference points is 0.5 as opposed to 1.0, yielding the curve of FIG. 2B.

Figure 3:
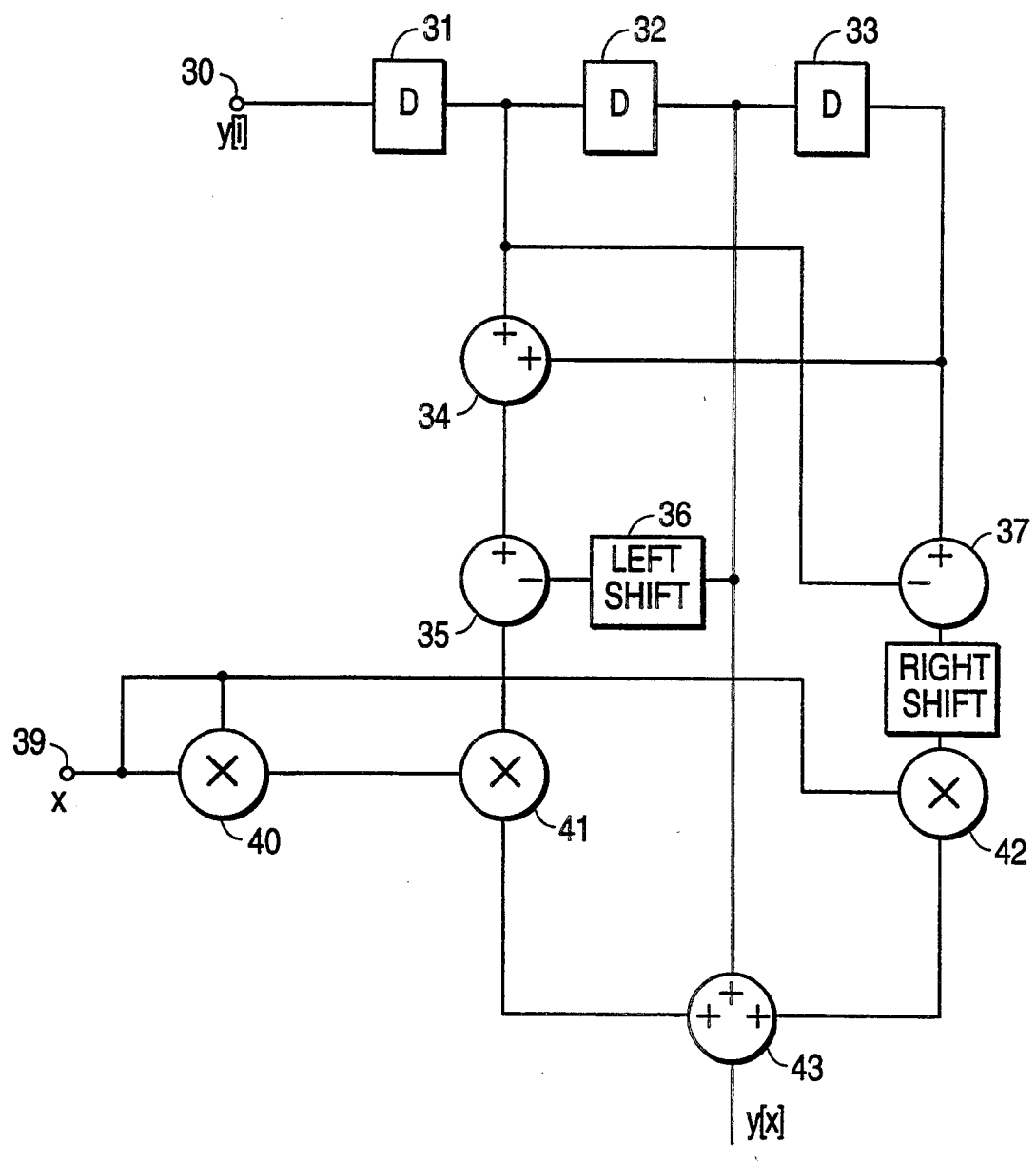
FIG. 3 is a block circuit diagram of a quadratic interpolator according to the preferred embodiment.

Turning now to the circuit diagram of FIG. 3, a preferred implementation of the quadratic interpolator of the present invention is illustrated for an input sample data stream.

The three data points $y(-1), y(0)$ and $y(1)$ are received via an input 30 and stored in respective ones of series-connected registers 31, 32 and 33.

An adder 34 adds the signal samples $y(-1)$ and $y(1)$ and applies the resulting signal to an non-inverting input of subtractor 35. The second reference sample point $y(0)$ is shifted one bit to the left in shift register 36, which has the effect of multiplying the value $y(0)$ by 2. The output of shift register 36 is applied to the inverting input of subtractor 35. Thus, the output of subtractor 35 corresponds to the value "a" from equation 6, namely:

$$a = y(-1) + y(1) - 2y(0).$$

Subtractor 37 takes the difference between $y(-1)$ and $y(1)$ and the output thereof is right-shifted by one bit in shift register 38, yielding the value "b" from equation 6, namely:

$$b = (y(1) - y(-1))/2.$$

The value of x is received on input 39 and is applied to both inputs of a multiplier 40 which therefore squares the value of x. Multipliers 41 and 42 perform the operations "$ax^2$" and "$bx$", respectively.

The three input adder 43 sums the outputs of multipliers 41 and 42 with $y(0)$ received from storage register 32, and in response produces the output interpolated value $y(x)$.

Although the preferred embodiment of the present invention has been defined in terms of a digital circuit shown in FIG. 3, other circuit configurations are possible for achieving the same result.

Furthermore, the method of quadratic interpolation according to the present invention may be implemented in software. The C source code listing for one such possible software implementation of the present invention is appended hereto as appendix A.

All such modifications and alternative embodiments of the present invention are believed to be within the sphere and scope of this invention as defined by the claims appended hereto.

---

Module   : Three point interpolation

Version  : 1.0

Author   : James Goel

Copyright(c) 1993 Genesis Microchip Inc.
              2900 John St.
              Markham, Ontario
              L3R 5G3
              (416) 470-2742

Module   :

vHorizontal 3 Point Zoom

Description :

This routine expands an image in the horizontal direction using a
   special 3 point zoom interpolation.

Inputs:

Source Line -- Structure containing the source line to be horizontally
                  expanded.
Outputs:

Target Line -- This buffer contains the resized horizontal line.

-----------------------------------------------------------------------*/
```
void
vHorzZoom( VIDEO_LINE *psSrcLine,
           FRAC_LINE  *psTarLine){ float    fTincAccum;    /* Tinc accumulator */
   float    fTinc;         /* Tinc value */
   float    fBoundary;     /* Boundary condition */
   float    X;             /* Distance from boundary pixel */

/*
      UpSampled equation:

P[x] = sAlpha*x^2 + sBeta*x + sCappa

*/
   FLOAT_PIX   sAlpha;
   FLOAT_PIX   sBeta;
   FLOAT_PIX   sCappa;

int      cbUpCount;    /* Up sampled pixel counter */
   int      cbSrcCount;   /* Source counter */
   int      iLeft;        /* Leftmost pixel */
   int      iMiddle;      /* Middle pixel */
   int      iRight;       /* Rightmost pixel */

/* Initialize variables */
   cbSrcCount = 0;
   cbUpCount  = 0;
   fTincAccum = 0;
   fTinc      = (float) iHorzTinc / (float) FLOAT_PRECISION;
   fBoundary  = (float) 0.5;

/* Initialize the first three pixel indexes */
   iLeft   = 1;
   iMiddle = 0;
   iRight  = 1;

/* Calculate the first sAlpha,sBeta,sCappa */
   vCalcABC (psSrcLine, iLeft, iMiddle, iRight, &sAlpha, &sBeta, &sCappa);

/* Move the source pointers to the next three pixels */
   iLeft   = 0;
   iMiddle = 1;
   iRight  = 2;

do
   {
      /* Calculate distance to the next centre pixel */
      X = fTincAccum - cbSrcCount;

/* IF the accumulate Tinc has crossed the boundary, THEN */
      if (fTincAccum >= fBoundary)
```

```
{
    /* IF the leftmost pixel has not reached the end of the source
       line, THEN */ if (iLeft < (cbSrcPix-1)-1)
        vCalcABC ( psSrcLine,iLeft++,iMiddle++,iRight++,
                   &sAlpha,&sBeta,&sCappa);
    else
        vCalcABC ( psSrcLine,iLeft, iMiddle, iLeft,
                   &sAlpha,&sBeta,&sCappa);
    fBoundary++;
    cbSrcCount++;
    X = fTincAccum - cbSrcCount;
} psTarLine->plRedpix[cbUpCount] = (long) (sAlpha.fRedpix*X*X +
                                         sBeta.fRedpix*X +
                                         sCappa.fRedpix);

psTarLine->plGrnpix[cbUpCount] = (long) (sAlpha.fGrnpix*X*X +
                                         sBeta.fGrnpix*X +
                                         sCappa.fGrnpix);

psTarLine->plBlupix[cbUpCount] = (long) (sAlpha.fBlupix*X*X +
                                         sBeta.fBlupix*X +
                                         sCappa.fBlupix);

cbUpCount++;
fTincAccum += fTinc;

} while (cbUpCount < cbTarPix);

-----------------------------------------------------------------------

Module :

vCalculate Alpha, Beta and Cappa for 3 point interpolation

Description :

This routine calculates Alpha, Beta and Cappa for a single horizontal
    line.

Inputs:

Source Line -- Structure containing the source line to be horizontally
                   expanded.

int iLeft, iMiddle, iRight
                -- Array indices that control which horizontal pixel is
                   processed.
Outputs:

sAlpha   -- Alpha value for equation (contains Red, Green and Blue)
    sBeta    -- Beta value for equation (contains Red, Green and Blue)
    sCappa   -- Cappa value for equation (contains Red, Green and Blue)

-----------------------------------------------------------------------*/
void calcABC (VIDEO_LINE   *psSrcLine,
              int          iLeft,
              int          iMiddle,
              int          iRight,
```

```
            FLOAT_PIX    *sAlpha,
            FLOAT_PIX    *sBeta,
            FLOAT_PIX    *sCappa){

/* Alpha = P[-1] + P[1] - 2*P[0] */ sAlpha->fRedpix = psSrcLine->pbRedpix[iLeft] +
                      psSrcLine->pbRedpix[iRight] -
                      2*psSrcLine->pbRedpix[iMiddle];

sAlpha->fGrnpix = psSrcLine->pbGrnpix[iLeft] +
                      psSrcLine->pbGrnpix[iRight] -
                      2*psSrcLine->pbGrnpix[iMiddle];

sAlpha->fBlupix = psSrcLine->pbBlupix[iLeft] +
                      psSrcLine->pbBlupix[iRight] -
                      2*psSrcLine->pbBlupix[iMiddle];

/* Beta = (P[1] - P[-1])/2 */ sBeta->fRedpix = (psSrcLine->pbRedpix[iRight] -
                      psSrcLine->pbRedpix[iLeft] )/2;

sBeta->fGrnpix = (psSrcLine->pbGrnpix[iRight] -
                      psSrcLine->pbGrnpix[iLeft] )/2;

sBeta->fBlupix = (psSrcLine->pbBlupix[iRight] -
                      psSrcLine->pbBlupix[iLeft] )/2;

/* Cappa = P[0] */ sCappa->fRedpix = psSrcLine->pbRedpix[iMiddle];
    sCappa->fGrnpix = psSrcLine->pbGrnpix[iMiddle];
    sCappa->fBlupix = psSrcLine->pbBlupix[iMiddle];
```

---

```
Module :

vVertical Zoom

Description :

This routine expands an image in the vertical direction.

Inputs:

Source Line -- Structure containing the source line to be vertically
                   expanded.
Outputs:

Target Line -- This buffer contains the resized vertical line.

-----------------------------------------------------------------------*/ void vVertZoom() { float    fTincAccum;     /* Tinc accumulator */
    float    fTinc;          /* Tinc value */
    float    fBoundary;      /* Boundary condition */
    float    X;              /* Distance from boundary line   */

/*
       UpSampled equation:

P[x] = sAlpha*x^2 + sBeta*x + sCappa
```

```
*/
FLOAT_LINE   sAlpha;
FLOAT_LINE   sBeta;
FLOAT_LINE   sCappa;

int       cbUpCount;      /* Up sampled pixel counter */
int       cbSrcCount;     /* Source counter */
int       cCount;         /* Pixel counter */

VIDEO_LINE  sLeft;        /* Leftmost line */
VIDEO_LINE  sMiddle;      /* Middlemost line */
VIDEO_LINE  sRight;       /* Rightmost line */

BYTE *pbRedTemp;
BYTE *pbGrnTemp;
BYTE *pbBluTemp;

FRAC_LINE   sTarLine;     /* Output target line */

/* Initialize variables */
cbSrcCount  = 0;
cbUpCount   = 0;
fTincAccum  = 0;
fTinc       = (float) iVertTinc / (float) FLOAT_PRECISION;
fBoundary   = (float) 0.5;

/* Allocate memory space for required lines */
vAllocSrcLine( &sMiddle );
vAllocSrcLine( &sRight  );
vAllocTarLine( &sTarLine );

vAllocFloatLine ( &sAlpha );
vAllocFloatLine ( &sBeta  );
vAllocFloatLine ( &sCappa );

/* Read in first three lines */
vReadRGB ( &sMiddle );
vReadRGB ( &sRight  );

for (cCount=0; cCount < cbSrcPix; cCount++)
{
   sLeft.pbRedpix[cCount]=sRight.pbRedpix[cCount];
   sLeft.pbGrnpix[cCount]=sRight.pbGrnpix[cCount];
   sLeft.pbBlupix[cCount]=sRight.pbBlupix[cCount];
}

/* Calculate the first sAlpha,sBeta,sCappa */
vCalcLineABC ( &sLeft, &sMiddle, &sRight,
               &sAlpha, &sBeta, &sCappa);

do
{
   /* Calculate distance to the next centre line */
   X = fTincAccum - cbSrcCount;

/* IF the accumulate Tinc has crossed the boundary, THEN */
   if (fTincAccum >= fBoundary)
   {

/* IF the leftmost line has not reached the end of the source
         line, THEN */ if ((cbSrcCount < (cbSrcLine-1)-1))
      {
         vAdvance ( &sLeft, &sMiddle, &sRight );
         vCalcLineABC (&sLeft,&sMiddle,&sRight,&sAlpha,&sBeta,&sCappa);
```

```
    }
    else
    {
        /* Make a temporary copy of the Left pointer */
        pbRedTemp = sLeft.pbRedpix;
        pbGrnTemp = sLeft.pbGrnpix;
        pbBluTemp = sLeft.pbBlupix;

/* Copy the Middle line to the Left line */
        sLeft.pbRedpix = sMiddle.pbRedpix;
        sLeft.pbGrnpix = sMiddle.pbGrnpix;
        sLeft.pbBlupix = sMiddle.pbBlupix;

/* Copy the Right line to the Middle line */
        sMiddle.pbRedpix = sRight.pbRedpix;
        sMiddle.pbGrnpix = sRight.pbGrnpix;
        sMiddle.pbBlupix = sRight.pbBlupix;

/* Copy the Left line to the Right line */
        sRight.pbRedpix = pbRedTemp;
        sRight.pbGrnpix = pbGrnTemp;
        sRight.pbBlupix = pbBluTemp;

vCalcLineABC (&sLeft,&sMiddle,&sRight,&sAlpha,&sBeta,&sCappa);
    }
    fBoundary++;
    cbSrcCount++;
    X = fTincAccum - cbSrcCount;
} for (cCount=0; cCount < cbSrcPix; cCount++)
{ sTarLine.plRedpix[cCount] = (long) (sAlpha.fRedpix[cCount]*X*X +
                                        sBeta.fRedpix[cCount]*X +
                                        sCappa.fRedpix[cCount]);

sTarLine.plGrnpix[cCount] = (long) (sAlpha.fGrnpix[cCount]*X*X +
                                        sBeta.fGrnpix[cCount]*X +
                                        sCappa.fGrnpix[cCount]);

sTarLine.plBlupix[cCount] = (long) (sAlpha.fBlupix[cCount]*X*X +
                                        sBeta.fBlupix[cCount]*X +
                                        sCappa.fBlupix[cCount]);
} vClampZoom (&sTarLine);
vWriteRGB ( &sTarLine );

cbUpCount++;
fTincAccum += fTinc;

vPercentComplete (cbUpCount,cbTarLine-1);
} while (cbUpCount < cbTarLine);

vDeallocSrcLine( &sLeft   );
vDeallocSrcLine( &sMiddle );
vDeallocSrcLine( &sRight  );
vDeallocTarLine( &sTarLine );

vDeallocFloatLine ( &sAlpha );
vDeallocFloatLine ( &sBeta  );
vDeallocFloatLine ( &sCappa );
}
```

```
void vCalcLineABC(VIDEO_LINE  *psLeft,
                  VIDEO_LINE  *psMiddle,
                  VIDEO_LINE  *psRight,
                  FLOAT_LINE  *psAlpha,
                  FLOAT_LINE  *psBeta,
                  FLOAT_LINE  *psCappa){ int   cCount;   /* Generic pixel counter */

/* Alpha = P[-1] + P[1] - 2*P[0] */ for (cCount=0; cCount < cbSrcPix; cCount++)
   {
      psAlpha->fRedpix[cCount] = psLeft->pbRedpix[cCount] +
                         psRight->pbRedpix[cCount] -
                         2*psMiddle->pbRedpix[cCount];

sLeft->pbRedpix = sMiddle->pbRedpix;
sLeft->pbGrnpix = sMiddle->pbGrnpix;
sLeft->pbBlupix = sMiddle->pbBlupix;

/* Copy the Right line to the Middle line */
sMiddle->pbRedpix = sRight->pbRedpix;
sMiddle->pbGrnpix = sRight->pbGrnpix;
sMiddle->pbBlupix = sRight->pbBlupix;

/* Copy the temporary left pointers to right */
sRight->pbRedpix = pbRedTemp;
sRight->pbGrnpix = pbGrnTemp;
sRight->pbBlupix = pbBluTemp;

/* Load new line */
vReadRGB(sRight);
```

*----------------------------------------------------------------------

Module :

vVertical Zoom Clamp

Description :

This routine clamps the line values of a horizontally expanded video line.

Inputs:

Target Line -- Contains all the unclamped lines.

Outputs:

Target Line -- All line values are between 0 and 255.

----                                                              ----*/

```
void vClampZoom ( FRAC_LINE *psTarLine ){ int   cCount;   /* Source line line counter */

/* Loop for the entire number of target pixels */ for (cCount=0; cCount < cbTarPix; cCount++) {
```

```
/* Clamp pixel to 0 or 255 */
if (psTarLine->plRedpix[cCount] > 255)
    psTarLine->plRedpix[cCount] = 255;
if (psTarLine->plRedpix[cCount] < 0)
    psTarLine->plRedpix[cCount] = 0;

if (psTarLine->plGrnpix[cCount] > 255)
    psTarLine->plGrnpix[cCount] = 255;
if (psTarLine->plGrnpix[cCount] < 0)
    psTarLine->plGrnpix[cCount] = 0;

if (psTarLine->plBlupix[cCount] > 255)
    psTarLine->plBlupix[cCount] = 255;

psAlpha->fGrnpix[cCount] = psLeft->pbGrnpix[cCount] +
                psRight->pbGrnpix[cCount] -
                2*psMiddle->pbGrnpix[cCount];

psAlpha->fBlupix[cCount] = psLeft->pbBlupix[cCount] +
                psRight->pbBlupix[cCount] -
                2*psMiddle->pbBlupix[cCount];

/* Beta = (P[1] - P[-1])/2 */ psBeta->fRedpix[cCount] = (psRight->pbRedpix[cCount] -
                psLeft->pbRedpix[cCount] )/2;

psBeta->fGrnpix[cCount] = (psRight->pbGrnpix[cCount] -
                psLeft->pbGrnpix[cCount] )/2;

psBeta->fBlupix[cCount] = (psRight->pbBlupix[cCount] -
                psLeft->pbBlupix[cCount] )/2;

/* Cappa = P[0] */ psCappa->fRedpix[cCount] = psMiddle->pbRedpix[cCount];
psCappa->fGrnpix[cCount] = psMiddle->pbGrnpix[cCount];
psCappa->fBlupix[cCount] = psMiddle->pbBlupix[cCount];

} void vAllocFloatLine (FLOAT_LINE *psLine){

/*...Allocate memory space for the red line buffer */
psLine->fRedpix = (float *) malloc(cbSrcPix*sizeof(float));
assert ( psLine->fRedpix != NULL);

/*...Allocate memory space for the red line buffer */
psLine->fGrnpix = (float *) malloc(cbSrcPix*sizeof(float));
assert ( psLine->fGrnpix != NULL);

/*...Allocate memory space for the red line buffer */
psLine->fBlupix = (float *) malloc(cbSrcPix*sizeof(float));
assert ( psLine->fBlupix != NULL);

void vDeallocFloatLine (FLOAT_LINE *psLine){
free(psLine->fRedpix);
free(psLine->fGrnpix);
free(psLine->fBlupix);

void vAdvance (VIDEO_LINE   *sLeft,
               VIDEO_LINE   *sMiddle,
               VIDEO_LINE   *sRight){
```

```
BYTE *pbRedTemp;
BYTE *pbGrnTemp;
BYTE *pbBluTemp;

/* Make a temporary copy of the Left pointer */
pbRedTemp = sLeft->pbRedpix;
pbGrnTemp = sLeft->pbGrnpix;
pbBluTemp = sLeft->pbBlupix;

if (psTarLine->plBlupix[cCount] < 0)
       psTarLine->plBlupix[cCount] = 0;
}
```

I claim:

1. A quadratic interpolator for generating an output signal sample y(x) for each one of a plurality of reference values x intermediate three known signal samples $y(-1)$, $y(0)$ and $y(1)$, wherein said three known signal samples are spaced apart a predetermined equal amount, and wherein y(x) is generated for x in a range of one-half said predetermined equal amount on either side of respective ones of said three known signal samples, comprising:
   a) means for adding said signal samples $y(-1)$ and $y(1)$ and in response generating a first sum signal sample $y(-1)+y(1)$;
   b) means for doubling said signal sample $y(0)$ and in response generating a first doubled signal sample $2y(0)$;
   c) means for subtracting said first doubled signal sample $2y(0)$ from said first sum signal sample $y(-1)+y(1)$ and in response generating a first difference signal sample $a=y(-1)+y(1)-2y(0)$;
   d) means for subtracting said signal sample $y(-1)$ from said signal sample $y(1)$ and in response generating a second difference signal $y(1)-y(-1)$;
   e) means for halving said second difference signal $y(1)-y(-1)$ and in response generating a first halved signal $b=(y(1)-y(-1)/2)$;
   f) means for squaring said each one of said plurality of reference values x and in response generating a respective squared reference value $x^2$;
   g) means for multiplying said first difference signal sample a by each said respective squared reference value $x^2$ and in response generating a respective first product signal sample $ax^2$;
   h) means for multiplying said first halved signal b by said each one of said plurality of reference values x and in response generating a respective second product signal sample bx; and
   i) means for adding each respective first product signal sample $ax^2$ and second product signal sample bx and said known signal sample $y(0)$ and in response generating said output signal sample y(x).

2. A method of generating a quadratic interpolated output signal sample y(x) for each one of a plurality of reference values x intermediate three known signal samples $y(-1)$, $y(0)$ and $y(1)$, wherein said three known signal samples are spaced apart a predetermined equal amount, and wherein y(x) is generated for x in a range of one-half said predetermined equal amount on either side of respective ones of said three known signal samples, comprising the steps of:
   a) adding said signal samples $y(-1)$ and $y(1)$ and in response generating a first sum signal sample $y(-1)+y(1)$;
   b) doubling said signal sample $y(0)$ and in response generating a first doubled signal sample $2y(0)$;
   c) subtracting said first doubled signal sample $2y(0)$ from said first sum signal sample $y(-1)+y(1)$ and in response generating a first difference signal sample $a=y(-1)+y(1)-2y(0)$;
   d) subtracting said signal sample $y(-1)$ from said signal sample $y(1)$ and in response generating a second difference signal $y(1)-y(-1)$;
   e) halving said second difference signal $y(1)-y(-1)$ and in response generating a first halved signal $b=(y(1)-y(-1)/2)$;
   f) squaring said each one of said plurality of reference values x and in response generating a respective squared reference value $x^2$;
   g) multiplying said first difference signal sample a by each said respective squared reference value $x^2$ and in response generating a respective first product signal sample $ax^2$;
   h) multiplying said first halved signal b by said each one of said plurality of reference values x and in response generating a respective second product signal sample bx; and
   i) adding each respective first product signal sample $ax^2$ and second product signal sample bx and said known signal sample $y(0)$ and in response generating said output signal sample y(x).

3. A circuit for generating an output signal sample y(x) for each one of a plurality of reference values x intermediate three known signal samples $y(-1)$, $y(0)$ and $y(1)$, wherein said three known signal samples are spaced apart a predetermined equal amount, and wherein y(x) is generated for x in a range of one-half said predetermined equal amount on either side of respective ones of said three known signal samples, comprising:
   a) a first input for receiving said three known signal samples $y(-1)$, $y(0)$ and $y(1)$;
   b) a second input for receiving said each one of said plurality of reference values x;
   c) first, second and third storage registers connected in series to said first input for storing said three known signal samples $y(-1)$, $y(0)$ and $y(1)$, respectively;
   d) a first adder connected to said first and third storage registers for adding said signal samples $y(-1)$ and $y(1)$ and in response generating a first sum signal sample $y(-1)+y(1)$;
   e) a first shift register connected to said second storage register for left-shifting said signal sample $y(0)$ by one bit and in response generating a first doubled signal sample $2y(0)$;
   f) a first subtracter connected to said first adder and said first shift register for subtracting said first doubled signal sample $2y(0)$ from said first sum signal sample $y(-1)+y(1)$ and in response generating a first difference signal sample $a = y(-1)+y(1)-2y(0)$;

g) a second subtracter connected to said first and third storage registers for subtracting said signal sample $y(-1)$ from said signal sample $y(1)$ and in response generating a second difference signal $y(1)-y(-1)$;

h) a second shift register connected to said second subtracter for right-shifting said second difference signal $y(1)-y(-1)$ by one bit and in response generating a first halved signal $b = (y(1)-y(-1)/2)$;

i) a first multiplier connected to said second input for squaring said each one of said plurality of reference values x and in response generating a respective squared reference value $x^2$;

j) a second multiplier connected to said first multiplier and said first subtracter for multiplying said first difference signal sample a by each said respective squared reference value $x^2$ and in response generating a respective first product signal sample $ax^2$;

k) a third multiplier connected to said second input and said second shift register for multiplying said first halved signal b by said each one of said plurality of reference values x and in response generating a respective second product signal sample bx; and l) a second adder connected to said second multiplier, said second storage register and said third multiplier for adding each respective first product signal sample $ax^2$ and second product signal sample bx and said known signal sample $y(0)$ and in response generating said output signal sample $y(x)$.

* * * * *

UNITED STATES PATENT AND TRADEMARK OFFICE
CERTIFICATE OF CORRECTION

PATENT NO. : 5,379,241
DATED : January 3, 1995
INVENTOR(S) : Lance GREGGAIN

It is certified that error appears in the above-indentified patent and that said Letters Patent is hereby corrected as shown below:

On the title page, item [56] References Cited, Line 2, "4,649,414" should be --4,694,414--.

Signed and Sealed this

Fourth Day of April, 1995

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO. : 5,379,241
DATED : January 3, 1995
INVENTOR(S) : Lance GREGGAIN

It is certified that error appears in the above-indentified patent and that said Letters Patent is hereby corrected as shown below:

```
Column 19, line 24, change "respective ones" to --a
          respective one--.
Column 19, line 64, change "respective ones" to --a
          respective one--.
Column 20, lines 49 and 50, change "respective ones" to
          --a respective one--.
```

Signed and Sealed this

Twenty-seventh Day of August, 1996

Attest:

BRUCE LEHMAN

*Attesting Officer*      *Commissioner of Patents and Trademarks*